(12) United States Patent
Shibata

(10) Patent No.: US 11,871,293 B2
(45) Date of Patent: Jan. 9, 2024

(54) COMMUNICATION TERMINAL AND COMPUTER PROGRAM PRODUCT FOR SELECTING BASE STATION TO BE CONNECTED

(71) Applicant: DENSO CORPORATION, Kariya (JP)

(72) Inventor: Hiroaki Shibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 398 days.

(21) Appl. No.: 17/350,810

(22) Filed: Jun. 17, 2021

(65) Prior Publication Data

US 2021/0314841 A1 Oct. 7, 2021

Related U.S. Application Data

(63) Continuation of application No. PCT/JP2019/046139, filed on Nov. 26, 2019.

(30) Foreign Application Priority Data

Dec. 20, 2018 (JP) ................................ 2018-238311

(51) Int. Cl.
*H04W 36/32* (2009.01)
*H04W 36/00* (2009.01)
(Continued)

(52) U.S. Cl.
CPC ....... *H04W 36/32* (2013.01); *H04W 36/0079* (2018.08); *H04W 36/305* (2018.08); *H04W 48/16* (2013.01); *H04W 48/20* (2013.01)

(58) Field of Classification Search
CPC ............. H04W 36/32; H04W 36/0079; H04W 36/305; H04W 48/16; H04W 48/20; H04W 64/00; H04W 24/08; H04W 24/10
See application file for complete search history.

(56) References Cited

U.S. PATENT DOCUMENTS

2002/0187792 A1* 12/2002 Kato ..................... H04W 48/20
455/423
2010/0317367 A1* 12/2010 Tamura ................. H04W 48/20
455/456.1

(Continued)

FOREIGN PATENT DOCUMENTS

| JP | 2001268616 A | * | 9/2001 |
| JP | 2010288153 A | | 12/2010 |
| JP | 2014127741 A | * | 7/2014 |

*Primary Examiner* — Shailendra Kumar
(74) *Attorney, Agent, or Firm* — Harness, Dickey & Pierce, P.L.C.

(57) ABSTRACT

A communication terminal includes a cellular communication portion configured to perform a cellular communication with base stations, a location information acquiring portion, a location information transmitting portion, a nearby base station information acquiring portion, a receiving level measuring portion, and a connection control portion. The connection control portion is configured to: select, as a connection target, the base station having a highest receiving level and attempt to connect to the connection target; exclude the selected base station from connection candidates when the attempt to connect to the selected base station failed; and subsequently select, as the connection target, the base station from nearby base stations in order of proximity to a current position of the communication terminal and attempt to connect to the selected base station.

8 Claims, 6 Drawing Sheets

(51) Int. Cl.
*H04W 36/30* (2009.01)
*H04W 48/16* (2009.01)
*H04W 48/20* (2009.01)

(56) References Cited

U.S. PATENT DOCUMENTS

2015/0244430 A1* 8/2015 Shattil ................. H04L 41/0816
370/254
2016/0234740 A1* 8/2016 Kashiwase ............ H04W 36/04

* cited by examiner

FIG. 3

NEARBY BASE STATION INFORMATION

| NUMBER | BASE STATION | RECEIVING LEVEL [dBm] |
|---|---|---|
| 1 | BASE STATION C | −85 |
| 2 | BASE STATION F | −86 |
| 3 | BASE STATION D | −80 |
| 4 | BASE STATION B | −82 |
| 5 | BASE STATION H | −83 |
| 6 | BASE STATION E | −93 |
| 7 | BASE STATION A | −98 |
| 8 | BASE STATION G | −110 |

COMMUNICATION TERMINAL AND COMPUTER PROGRAM PRODUCT FOR SELECTING BASE STATION TO BE CONNECTED

CROSS REFERENCE TO RELATED APPLICATION

The present application is a continuation application of International Patent Application No. PCT/JP2019/046139 filed on Nov. 26, 2019, which designated the U.S. and claims the benefit of priority from Japanese Patent Application No. 2018-238311 filed on Dec. 20, 2018. The entire disclosures of all of the above applications are incorporated herein by reference.

TECHNICAL FIELD

The present disclosure relates to a communication terminal and a computer program product for selecting base station to be connected.

BACKGROUND

In the current standards for cellular communication (3GPP: 3rd Generation Partnership Project, registered trademark), communication terminals such as cell phones and in-vehicle communication devices are configured to: receive radio waves transmitted from base stations; select the base station with the highest receiving level of radio waves as the connection target; and attempt to connect to the connection target. In this case, the base station closest to the current position of the communication terminal may not necessarily have the highest receiving level due to the effects of terrain and obstacles, for example. Accordingly, when the communication terminal is implemented according to 3GPP standards, so-called overreach may occur and cellular communication may not be established. The overreach is a situation where radio waves transmitted from the base station are received by the communication terminal while radio waves transmitted from the communication terminal are not received by the base station. Accordingly, when the communication terminal has a function of emergency call service and the overreach occurs at a place where an emergency situation such as a collision occurs, the emergency call service is not available at the place even when the communication terminal is within the communication range.

SUMMARY

According to a first aspect of the present disclosure, a communication terminal includes a cellular communication portion, a location information acquiring portion, a location information transmitting portion, a nearby base station information acquiring portion, a receiving level measuring portion, and a connection control portion. The cellular communication portion is configured to perform a cellular communication with base stations. The location information acquiring portion is configured to acquire location information indicating a current position of the communication terminal. The location information transmitting portion is configured to cause the cellular communication portion to transmit the location information to the communication network. The nearby base station information acquiring portion configured to acquire nearby base station information from the communication network through the cellular communication portion, the nearby base station information indicating nearby base stations located in a vicinity of the communication terminal. The receiving level measuring portion is configured to measure a receiving level of radio waves from each base station at predetermined intervals and with a predetermined algorithm according to 3GPP standards, and create a list in which the base stations are listed in a decreasing order of the receiving level. The connection control portion is configured to select a connection target from the base stations and attempt to connect to the connection target. The connection control portion is configured to: select, as the connection target, the base station having a highest receiving level and attempt to connect to the connection target; exclude the selected base station from connection candidates when the attempt to connect to the selected base station failed; and subsequently select, as the connection target, the base station from the nearby base stations in order of proximity to the current position of the communication terminal and attempt to connect to the selected base station.

According to a second aspect of the present disclosure, a computer program product is stored on a non-transitory computer readable medium and includes instructions configured to, when executed by at least one processor of a communication terminal having a cellular communication portion configured to perform a cellular communication with base stations, cause the at least one processor to: acquire location information indicating a current position of the communication terminal; cause the cellular communication portion to transmit the location information to a communication network; acquire nearby base station information from the communication network through the cellular communication portion, the nearby base station information indicating nearby base stations located in a vicinity of the communication terminal; measure a receiving level of radio waves from each base station at predetermined intervals and with a predetermined algorithm according to 3GPP standards; create a list in which the base stations are listed in a decreasing order of the receiving level; select, as a connection target, the base station having a highest receiving level and attempt to connect to the connection target; exclude the selected base station from connection candidates when the attempt to connect to the selected base station failed; and subsequently select, as the connection target, the base station from the nearby base stations in order of proximity to the current position of the communication terminal and attempt to connect to the selected base station.

According to a third aspect of the present disclosure, a communication terminal includes a cellular communication device and at least one processor. The cellular communication device is configured to perform a cellular communication with base stations. The at least one processor is configured to: acquire location information indicating a current position of the communication terminal; cause the cellular communication device to transmit the location information to the communication network; acquire nearby base station information from the communication network through the cellular communication device, the nearby base station information indicating nearby base stations located in a vicinity of the communication terminal; measure a receiving level of radio waves from each base station at predetermined intervals and with a predetermined algorithm according to 3GPP standards; create a list in which the base stations are listed in a decreasing order of the receiving level; select, as a connection target, the base station having a highest receiving level and attempt to connect to the connection target; exclude the selected base station from connection candidates when the attempt to connect to the selected base station failed; and subsequently select, as the connection target, the base station from the nearby base stations in order of proximity to the current position of the communication terminal and attempt to connect to the selected base station.

BRIEF DESCRIPTION OF THE DRAWINGS

FIG. 3 is a table showing a nearby base station information.

EMBODIMENTS

Comparative Examples

Figure 1:
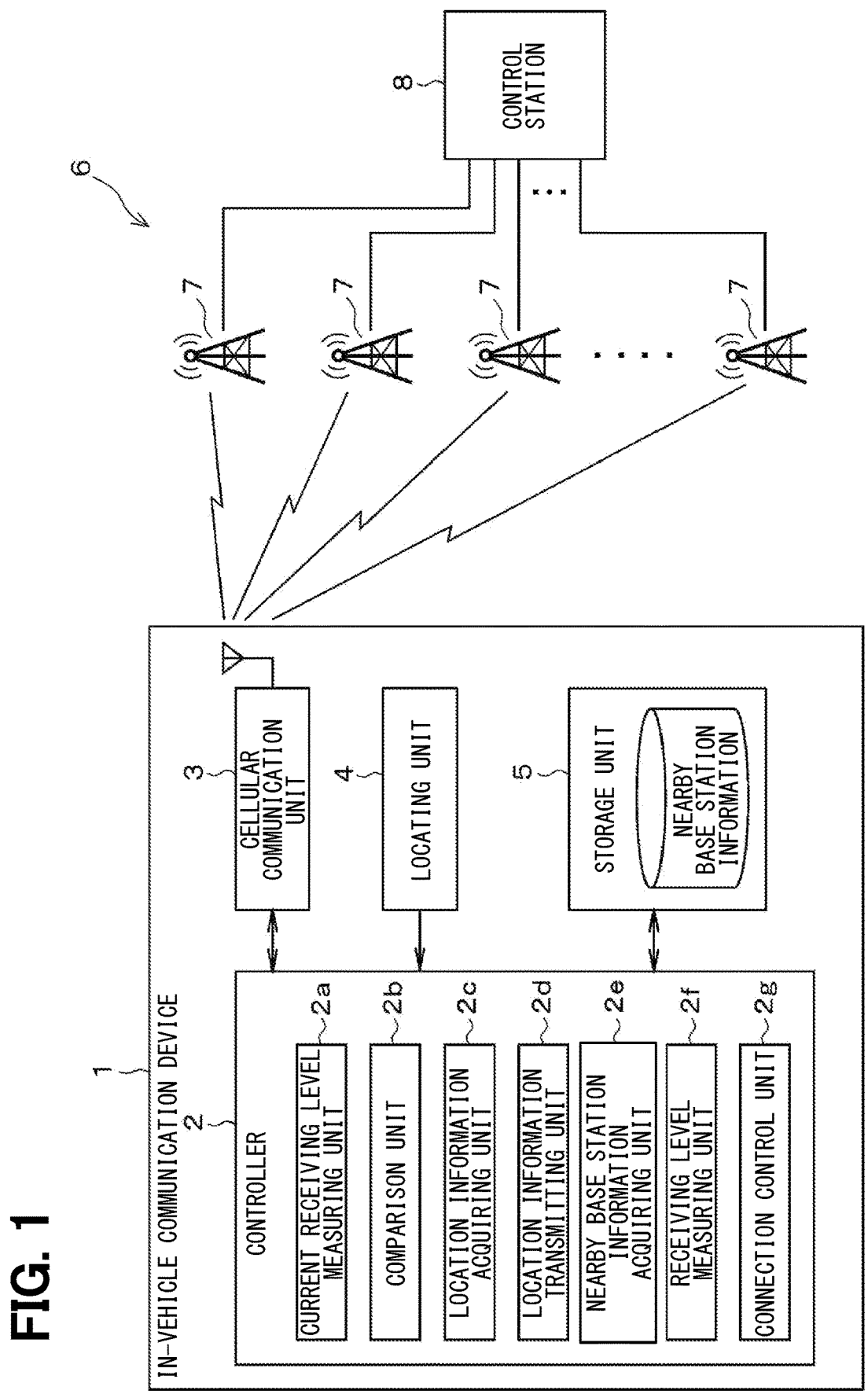
FIG. 1 is a functional block diagram illustrating overall configurations of an embodiment.

A communication terminal according to a first comparative example of the present disclosure is configured to exclude, from the connection candidates, the base stations outside a predetermined distance from the current position of the communication terminal, and set the base stations inside the predetermined distance as the connection candidates. The communication terminal according to the first comparative example is configured to select, as a connection target, the base station having the highest receiving level of radio waves from the connection candidates and attempt to connect to the connection target.

According to the first comparative example, it may be difficult to determine an appropriate distance as the predetermined distance. A communication terminal according to a second comparative example of the present disclosure is configured to: measure the receiving level of radio waves transmitted from the nearby base stations located in the vicinity of the communication terminal; select, as the connection target, the base station having the highest receiving level and attempt to connect to the connection target; exclude the base station for a certain amount of time from the connection candidates when the attempt of the connection to the base station fails a predetermined times. According to the second comparative example, since the base station to which the attempt of the connection fails the predetermined times is excluded, the communication terminal select the base station having the next (second) highest receiving level as the connection target and attempt to connect to the connection target when the communication terminal next measures the receiving levels of the nearby base stations.

According to the second comparative example, when there are multiple base stations which are likely to cause the overreach, multiple base stations are excluded from the connection candidates, and accordingly the time required to establish the cellular communication may increase. Further, when the communication terminal is moving, the excluded base stations are not selected as the connection target until the excluded base stations return to the connection candidates even if the communication terminal approaches the excluded base station, and accordingly the communication terminal may not be connected to optimum base station.

Hereinafter, an embodiment applied to an in-vehicle communication device mounted on a vehicle is described with reference to the drawings. The in-vehicle communication device 1 includes a controller 2, a cellular communication unit 3, a locating unit 4, and a storage unit 5. The controller 2 includes a microcomputer having a CPU (central processing unit), a ROM (read only memory), a RAM (random access memory), and the like. The controller 2 executes a control program stored in a non-transitory tangible storage medium to perform various processes and controls the operation of the in-vehicle communication device 1. The control program executed by the controller 2 includes a program for selecting a base station to be connected.

The cellular communication unit 3 is configured to perform a cellular communication with a communication network 6. The communication network 6 is a communication network based on 3GPP standards and includes multiple base stations 7 scattered over a wide area, and a control station 8 configured to control the base stations 7. The control station 8 is configured to monitor a state of connection between the in-vehicle communication device 1 and each base station 7, and manage information whether the in-vehicle communication device 1 is within or out of the communication area of each base station 7. The cellular communication unit 3 may be an in-vehicle antenna, for example.

The locating unit 4 includes a GPS (Global Positioning System) receiver, a geomagnetic sensor, an acceleration sensor, and the like. The locating unit 4 is configured to locate a current position of the in-vehicle communication device 1 using a calculation result of parameters extracted from a GPS signal, a detection result of the geomagnetic sensor, a detection result of the acceleration sensor, and the like. The locating unit 4 is configured to output the locating result to the controller 2. In the present embodiment, the locating unit 4 is provided inside the in-vehicle communication device 1. However, the locating unit 4 may be provided outside the in-vehicle communication device 1 and transmit the locating result to the in-vehicle communication device 1 through an in-vehicle LAN (Local Area Network), for example.

The controller 2 includes a current receiving level measuring unit 2a, a comparison unit 2b, a location information acquiring unit 2c, a location information transmitting unit 2d, a nearby base station information acquiring unit 2e, a receiving level measuring unit 2f, and a connection control unit 2g. These units 2a-2g correspond to processes of the program executed by the microcontroller for selecting the base station to be connected.

The current receiving level measuring unit 2a is configured to measure, as a current level, a receiving level of radio waves from a current base station which is the base station 7 communicating with the cellular communication unit 3. The comparison unit 2b is configured to compare the current level with a first predetermined threshold value after the current level is measured by the current receiving level measuring unit 2a.

The location information acquiring unit 2c is configured to acquire the location information indicating a current position of the in-vehicle communication device 1 from the measurement result of the locating unit 4. When the comparison unit 2b determines that the current level is lower than the first predetermined threshold value, the location information transmitting unit 2d causes the cellular communication unit 3 to transmit the location information acquired by the location information acquiring unit 2c to the communication network 6. When the control station 8 receives the location information transmitted from the in-vehicle communication device 1 through the base station 7 in the communication network 6, the control station 8 identifies the current position of the in-vehicle communication device 1 based on the received location information, and identifies the nearby base station in the vicinity of the in-vehicle communication device 1. The control station 8 transmits the nearby base station information indicating the identified nearby base stations to the in-vehicle communication device 1 through the base station 7.

When the cellular communication unit 3 receives the nearby base station information from the communication network 6, the nearby base station information acquiring unit 2e acquires the nearby base station information and stores the acquired nearby base station information in the storage unit 5. The nearby base station information acquired from the communication network 6 is sorted in an increasing order of proximity to the current position of the in-vehicle communication device 1. The receiving level measuring unit 2f is configured to measure the receiving levels of radio waves from the base stations 7 at a predetermined cycle and with a predetermined algorithm according to 3GPP standards, and creates a list in which the base stations are listed in a decreasing order of the receiving level. The connection control unit 2g is configured to select a connection target from the base stations and attempt to connect to the connection target.

Figure 2:
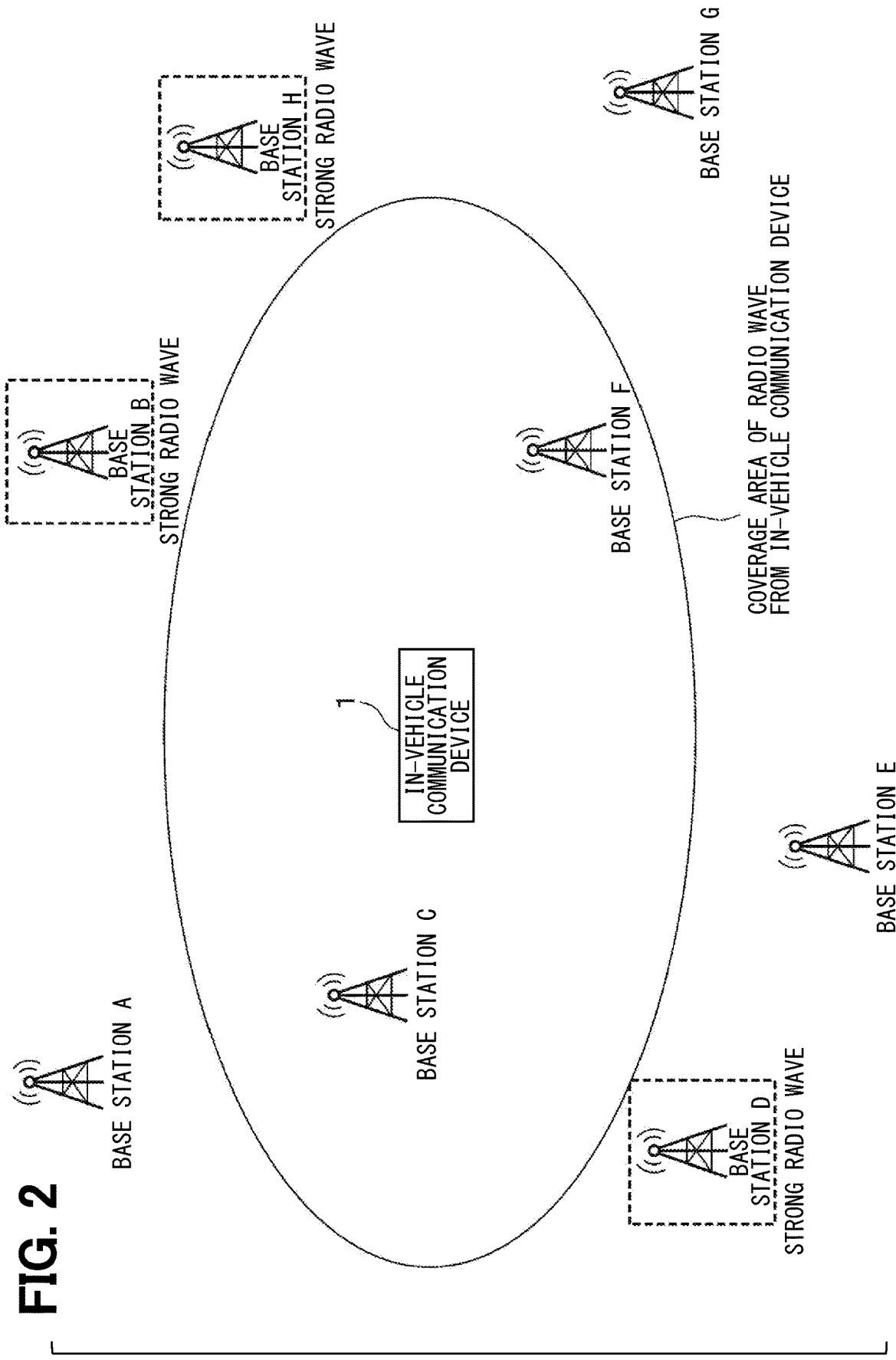
FIG. 2 is a diagram illustrating positional relationships between an in-vehicle communication device and base stations.

When the base stations A-H exist around the in-vehicle communication device 1 as shown in FIG. 2, the in-vehicle communication device 1 transmits the location information from the cellular communication unit 3 to the communication network 6, and thereby the in-vehicle communication device 1 acquires the nearby base station information shown in FIG. 3 from the communication network 6. In the example shown in FIG. 3, the base station C, the base station F, the base station D, the base station B, the base station H, the base station E, the base station A, and the base station G are closer in order from the current position of the in-vehicle communication device 1, and the base station D, the base station B, the base station H, the base station C, the base station F, the base station E, the base station A, and the base station G have higher receiving level of radio waves in order. That is, in FIG. 3, the base station D, the base station B, and the base station H have high transmission levels of radio waves, and the receiving levels of the radio waves received by the in-vehicle communication device 1 from these base stations are higher than the base station C and the base station F even though the base stations D, B, H are farther from the current position of the in-vehicle communication device 1 than the base station C and the base station F. That is, when the base station D, the base station B, and the base station H are out of the coverage of the radio waves transmitted from the in-vehicle communication device 1, an overreach may occur at the base stations D, B, H.

Figure 4:
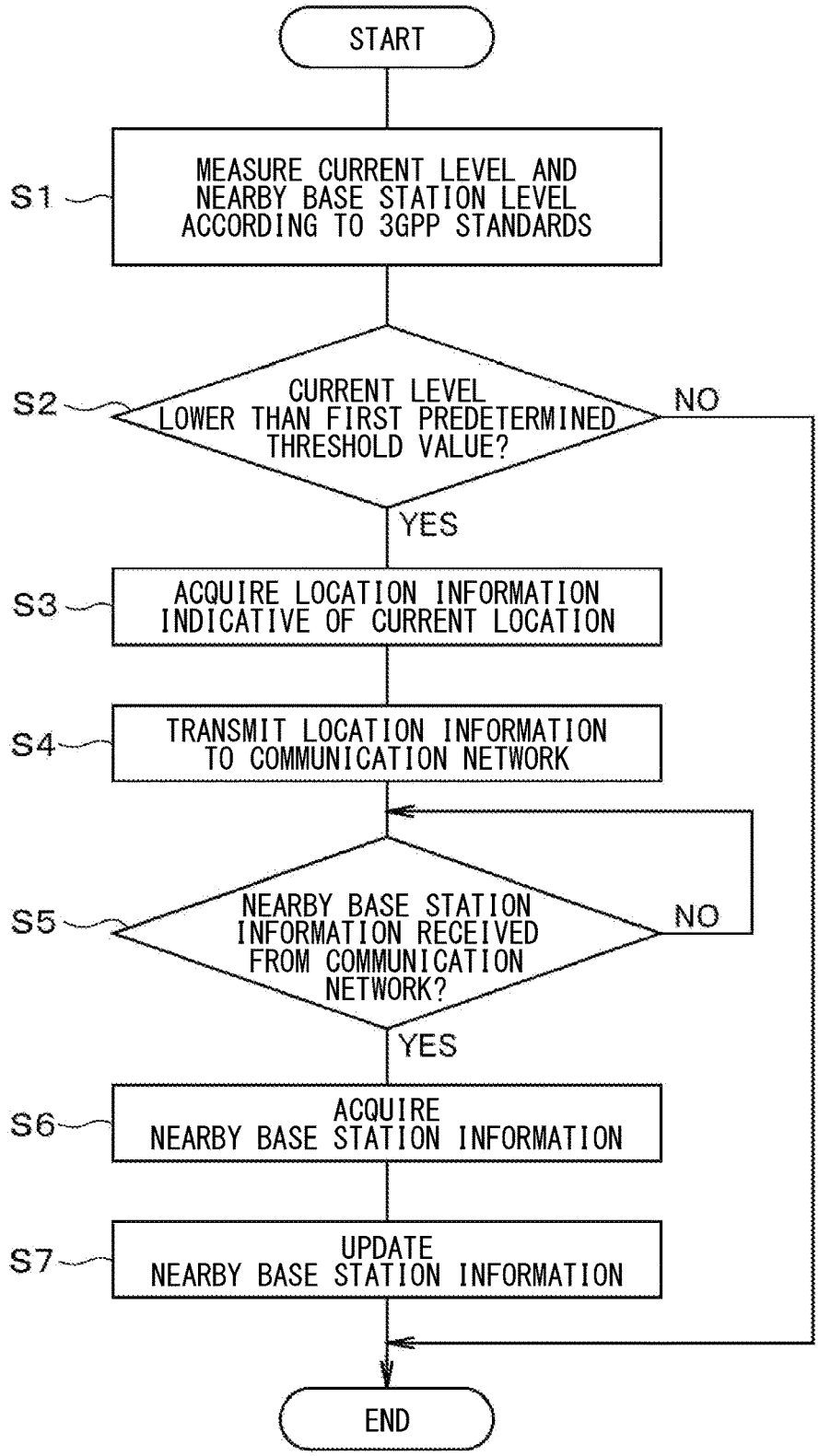
FIG. 4 is a flowchart illustrating an update process for the nearby base station information.
Figure 5:
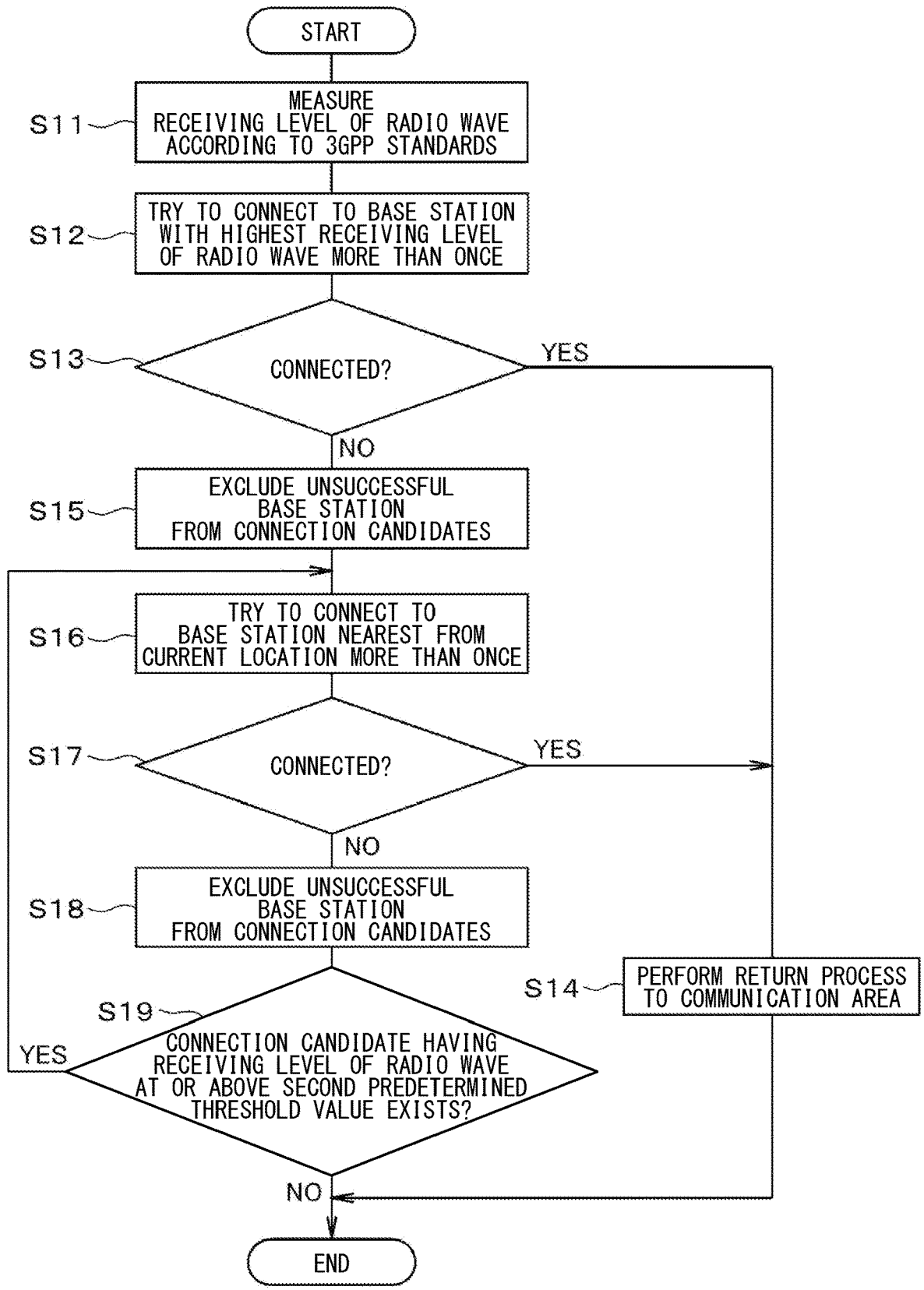
FIG. 5 is a flowchart illustrating a determination process of return to a communication area.
Figure 6:
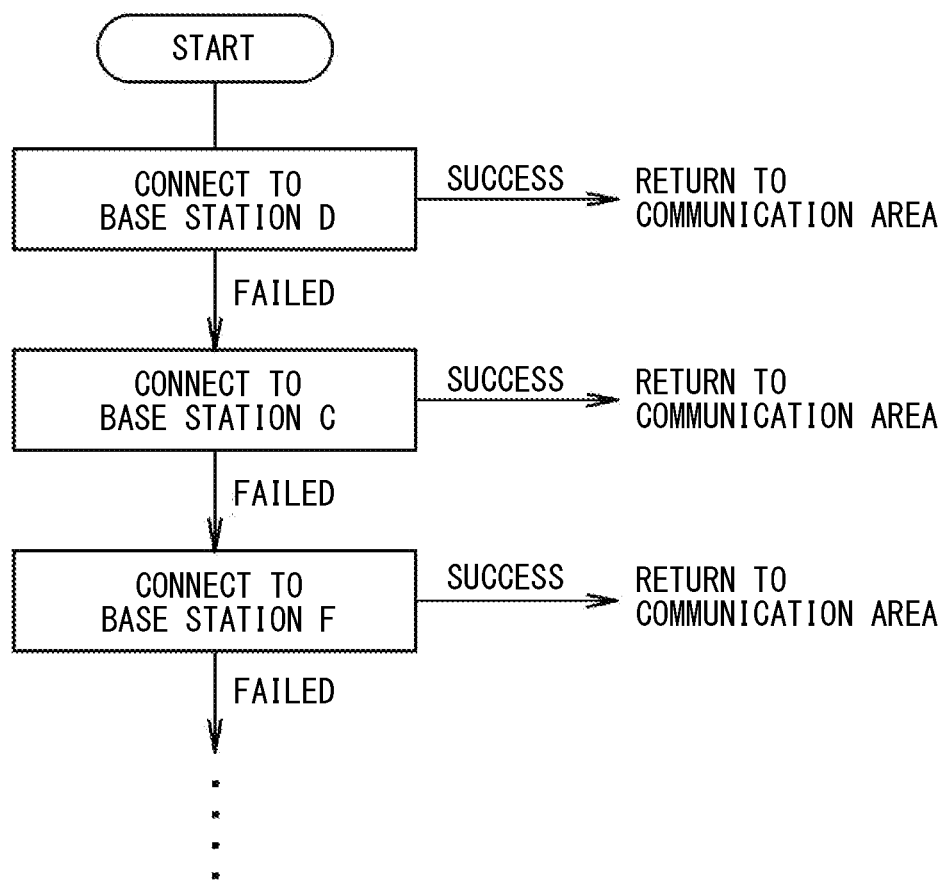
FIG. 6 is a flowchart illustrating a transition of a connection target.

The following will describe an operation of the above configuration with reference to FIG. 4 to FIG. 6. Here, the update process for the nearby base station information and the determination process of return to a communication area will be described.

(1) Update Process for Nearby Base Station Information

When the in-vehicle communication device 1 is out of the communication area, the control unit 2 starts the update process for the nearby base station information at the timing of an out-of-range search based on predetermined out-of-range search intervals. When the update process for the nearby base station information is started, the control unit 2 measures the current level and the receiving level of the nearby base stations according to the 3GPP standards (S1). The control unit 2 determines whether the current level is lower than the first predetermined threshold value by comparing the measured current level with the first predetermined threshold value (S2).

When the control unit 2 determines that the current level is not lower than the first predetermined threshold value (S2: NO), the control unit 2 terminates the update process for the nearby base station information and waits for the next timing of the out-of-range search. When the control unit 2 determines that the current level is lower than the first predetermined threshold value (S2: YES), the control unit 2 acquires the location information indicating the current position of the in-vehicle communication device 1 based on the locating result of the locating unit 4 (S3, location information acquiring process). Upon acquiring the location information, the control unit 2 transmits the acquired location information to the communication network 6 through the cellular communication unit 3 (S4, location information transmission process), and waits for a reception of the nearby base station information from the communication network 6 (S5).

When the control unit 2 determines that the cellular communication unit 3 receives the nearby base station information from the communication network 6 (S5: YES), the control unit 2 acquires the received nearby base station information (S6, nearby base station information acquiring process). The control unit 2 updates the nearby base station information stored in the storage unit 5 by storing the acquired nearby base station information in the storage unit 5 (S7), terminates the update process for the nearby base station information, and waits for the next timing of the out-of-range search.

(2) Determination Process of Return to the Communication Area

When the control unit 2 determines that the in-vehicle communication device 1 has moved out of the communication area, the control unit 2 starts the determination process of return to the communication area. When the determination process of return to the communication area is started, the control unit 2 measures the receiving levels of radio waves from the base stations at predetermined intervals and with a predetermined algorithm according to 3GPP standards, and creates a list in which the base stations are listed in a decreasing order of the receiving level (S11, receiving level measurement process). After creating the list, the control unit 2 selects, as the connection target, the base station having the highest receiving level of radio waves and attempts to connect to the connection target more than once (S12, first connection process). The control unit 2 determines whether the attempt of the connection is succeeded (S13). When the control unit 2 determines that the connection is succeeded (S13: YES), the control unit 2 sets the connected base station to which the attempt to connect is succeeded as the current base station and performs a return process to the communication area (S14), and then the determination process of return to the communication area is terminated.

In contrast, when the control unit 2 determines that the attempt of the connection failed (S13: NO), the control unit 2 excludes the base station to which the attempt of the connection failed from connection candidates (S15: connection candidate exclusion process). The control unit 2 refers to the nearby base station information in which the failed base station is excluded from the connection candidates, selects as the connection target the base station closest to the current position of the in-vehicle communication device 1 in the nearby base stations, and attempts to connect to the connection target more than once (S16: second connection process). The control unit 2 determines whether the attempts of the connection is succeeded (S17). When the control unit 2 determines that the attempt of the connection is succeeded (S17: YES), the control unit 2 sets the connected base station as the current base station and performs a return process to the communication area (S14), and then the determination process of return to the communication area is terminated.

In contrast, when the control unit 2 determines that the attempt of the connection failed (S17: NO), the control unit 2 excludes the base station to which the attempt of the connection failed from connection candidates (S18). The control unit 2 refers to the nearby base station information in which the failed base station is excluded from the connection candidates, and determines whether a connection candidate having the receiving level of the radio waves at or higher than a second predetermined threshold value exists (S19). When the control unit 2 determines that the connection candidate having the receiving level of the radio waves at or higher than the second predetermined threshold value exists (S19: YES), the procedure returns to step S16 and the processes from S16 are repeated. When the control unit 2 determines that the connection candidate having the receiving level of radio waves at or higher than the second predetermined threshold value does not exist (S19: NO), the determination process of return to the communication area is terminated without performing the return process to the communication area.

When the nearby base station information is as shown in FIG. 3, the control unit 2 first attempts to connect to the base station D which is not closest to the current position of the in-vehicle communication device 1 but has the highest receiving level, as shown in FIG. 6. When the attempt of the connection to the base station D is succeeded, the control unit 2 sets the base station D as the current base station and returns to the communication area. In contrast, when the attempt of the connection to the base station D failed, the control unit 2 excludes the base station D from the connection candidates and attempts to connect to the base station C closest to the current position of the in-vehicle communication device 1 in the connection candidates. When the attempt of the connection to the base station C is succeeded, the control unit 2 sets the base station C as the current base station and returns to the communication area. In contrast, when the attempt of the connection to the base station C failed, the control unit 2 excludes the base station C from the connection candidates and attempts to connect to the next closest base station F from the current position of the in-vehicle communication device 1 in the connection candidates. When the attempt of the connection to the base station F is succeeded, the control unit 2 sets the base station F as the current base station and returns to the communication area. In contrast, when the attempt of the connection to the base station F failed, the control unit 2 excludes the base station F from the connection candidates and attempts to connect to the next closest base station B from the current position of the in-vehicle communication device 1 in the connection candidates. The control unit 2 repeats the same process.

The present embodiment as described above provides the following technical effects. The in-vehicle communication device 1 is configured to: attempt to connect to the base station 7 having the highest receiving level of radio waves according to 3GPP standards; exclude the failed base station 7 from the connection candidates when the attempt of the connection to the base station 7 failed; and subsequently attempt to connect to the base stations 7 in order of proximity to the current position of the in-vehicle communication device 1. Accordingly, even when multiple base stations 7 which may cause the overreach exist, only one base station 7 which may first cause the overreach is excluded from the connection candidates, and the remaining base stations 7 are not excluded from the connection candidates. And then, the in-vehicle communication device 1 attempts to connect to the base station 7 in order of the proximity to the current position of the in-vehicle communication device 1, and accordingly the time required to establish the cellular communication can be shortened. Moreover, since the number of the exclusion of the base stations 7 from the connection candidates is reduced, the possibility of connecting to the optimum base station 7 can be increased even when the in-vehicle communication device 1 moves. Accordingly, the cellular communication can be appropriately established while reducing the influence of overreach.

The in-vehicle communication device 1 is configured to transmit the location information to the communication network 6 through the cellular communication unit 3 when the current level is lower than the first predetermined threshold value. When the location information is periodically transmitted to the communication network 6, the load on the communication network 6 may be unnecessarily increased. Further, when the system charges for the transmission of the location information, the periodical transmission of the location information may unnecessarily increase the communication fees. Moreover, the periodically transmission of the location information may unnecessarily increase the power consumption. However, in the present embodiment, since the location information is transmitted when the current level is lower than the first predetermined threshold value, such disadvantages can be avoided.

The in-vehicle communication device 1 is configured to attempt to connect to the base station 7 in order of proximity to the current position of the in-vehicle communication device 1, and exclude the failed base station 7 from the connection candidates when the attempt to connect to the base station 7 failed. Since the base station 7 to which the attempt to connect failed is excluded from the connection candidates, it can be possible to avoid a situation where the connection to the base station 7 that is unlikely to succeed is attempted again.

The in-vehicle communication device 1 is configured to set, as the connection candidates, the base stations 7 having the receiving level of radio waves at or higher than the second predetermined threshold value when the in-vehicle communication device 1 selects the base station 7 as the connection target in order of proximity to the current position and attempts to connect to the connection target, and then the in-vehicle communication device 1 selects the base station 7 from the connection candidates as the connection target and attempts to connect to the connection target. Since the base stations 7 having the receiving level of radio waves lower than the second predetermined threshold value are excluded from the connection candidates, it may be possible to avoid a situation where the in-vehicle communication device 1 attempts to connect to the base station 7 which is unlikely to succeed in the connection.

The in-vehicle communication device 1 is configured to attempt to connect to the base station 7 selected as the connection target more than once when the base station 7 having the highest receiving level of radio waves is selected as the connection target according to 3GPP standards. Since accidental connection failures can be eliminated by attempting the connection more than once, the possibility of a successful connection to the base station 7 can be increased.

The in-vehicle communication device 1 is also configured to attempt to connect to the base station 7 selected as the connection target more than once when the base station 7 is selected from the nearby base stations as the connection target in order of proximity to the current position of the in-vehicle communication device 1. Since accidental connection failures can be eliminated by attempting the connection more than once, the possibility of a successful connection to the base station 7 can be increased.

Although the present disclosure has been described in accordance with the examples, it is understood that the present disclosure is not limited to such examples or structures. The present disclosure encompasses various modifications and variations within the scope of equivalents. Additionally, various combinations and configurations, as well as other combinations and configurations including more, less, or only a single element, are within the scope and spirit of the present disclosure. In the above-described embodiment, the present disclosure is applied to the in-vehicle communication device as a communication terminal. However, the present disclosure may be applied to portable terminals such as a smartphone and a tablet.

The controller and the method described in the present disclosure may be implemented by a dedicated computer including a processor programmed to execute one or more functions embodied by a computer program and a memory. Alternatively, the controller and method described in the present disclosure may be implemented by a special purpose computer which includes a processor with one or more dedicated hardware logic circuits. Alternatively, the controller and method described in the present disclosure may be implemented by one or more special purpose computers, which is configured as a combination of a processor and a memory, which are programmed to perform one or more functions, and a processor which is configured with one or more hardware logic circuits. The computer program may also be stored on a computer readable non-transitory tangible recording medium as instructions to be executed by a computer.

What is claimed is:

1. A communication terminal comprising:
a cellular communication portion configured to perform a cellular communication with base stations;
a location information acquiring portion configured to acquire location information indicating a current position of the communication terminal;
a location information transmitting portion configured to cause the cellular communication portion to transmit the location information to a communication network;
a nearby base station information acquiring portion configured to acquire nearby base station information from the communication network through the cellular communication portion, the nearby base station information indicating nearby base stations located in a vicinity of the communication terminal;
a receiving level measuring portion configured to
 measure a receiving level of radio waves from each base station at predetermined intervals and with a predetermined algorithm according to 3GPP standards, and
 create a list in which the base stations are listed in a decreasing order of the receiving level; and
a connection control portion configured to select a connection target from the base stations and attempt to connect to the connection target, wherein
the connection control portion is configured to
 select, as the connection target, the base station having a highest receiving level and attempt to connect to the selected base station,
 exclude the selected base station from connection candidates when the attempt to connect to the selected base station failed, and
 subsequently select, as the connection target, the base station from the nearby base stations in order of proximity to the current position of the communication terminal and attempt to connect to the selected base station.

2. The communication terminal according to claim 1, further comprising:
a current receiving level measuring portion configured to measure a current level which is the receiving level of radio waves from the base station communicating with the cellular communication portion; and
a comparison portion configured to compare the current level measured by the current receiving level measuring portion with a first predetermined threshold value, wherein
the location information transmitting portion is configured to cause the cellular communication portion to transmit the location information to the communication network when the comparison portion determines that the current level is lower than the first predetermined threshold value.

3. The communication terminal according to claim 1, wherein
the connection control portion is configured to
 select, as the connection target, the base station from the nearby base stations in order of the proximity to the current position of the communication terminal and attempt to connect to the connection target, and
 exclude the selected base station from the connection candidates when the attempt to connect to the selected base station failed.

4. The communication terminal according to claim 1, wherein
when the connection control portion selects, as the connection target, the base station from the nearby base stations in order of the proximity to the current position of the communication terminal, the connection control portion selects, as the connection target, the base station from the connection candidates having the receiving level at or higher than a second predetermined threshold value and attempts to connect to the connection target.

5. The communication terminal according to claim 1, wherein
when the connection control portion selects, as the connection target, the base station having the highest receiving level, the connection control portion attempts to connect to the connection target more than once.

6. The communication terminal according to claim 1, wherein
when the connection control portion selects, as the connection target, the base station from the nearby base stations in order of the proximity to the current position of the communication terminal, the connection control portion attempts to connect to the connection target more than once.

7. A computer program product stored on a non-transitory computer readable medium and comprising instructions configured to, when executed by at least one processor of a communication terminal having a cellular communication portion configured to perform a cellular communication with base stations, cause the at least one processor to:

acquire location information indicating a current position of the communication terminal;

cause the cellular communication portion to transmit the location information to a communication network;

acquire nearby base station information from the communication network through the cellular communication portion, the nearby base station information indicating nearby base stations located in a vicinity of the communication terminal;

measure a receiving level of radio waves from each base station at predetermined intervals and with a predetermined algorithm according to 3GPP standards;

create a list in which the base stations are listed in a decreasing order of the receiving level;

select, as a connection target, the base station having a highest receiving level and attempt to connect to the connection target;

exclude the selected base station from connection candidates when the attempt to connect to the selected base station failed; and subsequently select, as the connection target, the base station from the nearby base stations in order of proximity to the current position of the communication terminal and attempt to connect to the selected base station.

8. A communication terminal comprising:
a cellular communication device configured to perform a cellular communication with base stations; and
at least one processor configured to:
acquire location information indicating a current position of the communication terminal;
cause the cellular communication device to transmit the location information to a communication network;
acquire nearby base station information from the communication network through the cellular communication device, the nearby base station information indicating nearby base stations located in a vicinity of the communication terminal;
measure a receiving level of radio waves from each base station at predetermined intervals and with a predetermined algorithm according to 3GPP standards;
create a list in which the base stations are listed in a decreasing order of the receiving level;
select, as a connection target, the base station having a highest receiving level and attempt to connect to the connection target;
exclude the selected base station from connection candidates when the attempt to connect to the selected base station failed; and
subsequently select, as the connection target, the base station from the nearby base stations in order of proximity to the current position of the communication terminal and attempt to connect to the selected base station.

* * * * *